No. 895,869. PATENTED AUG. 11, 1908.
O. O. KRUH.
RECTIFIER SYSTEM.
APPLICATION FILED DEC. 28, 1906.
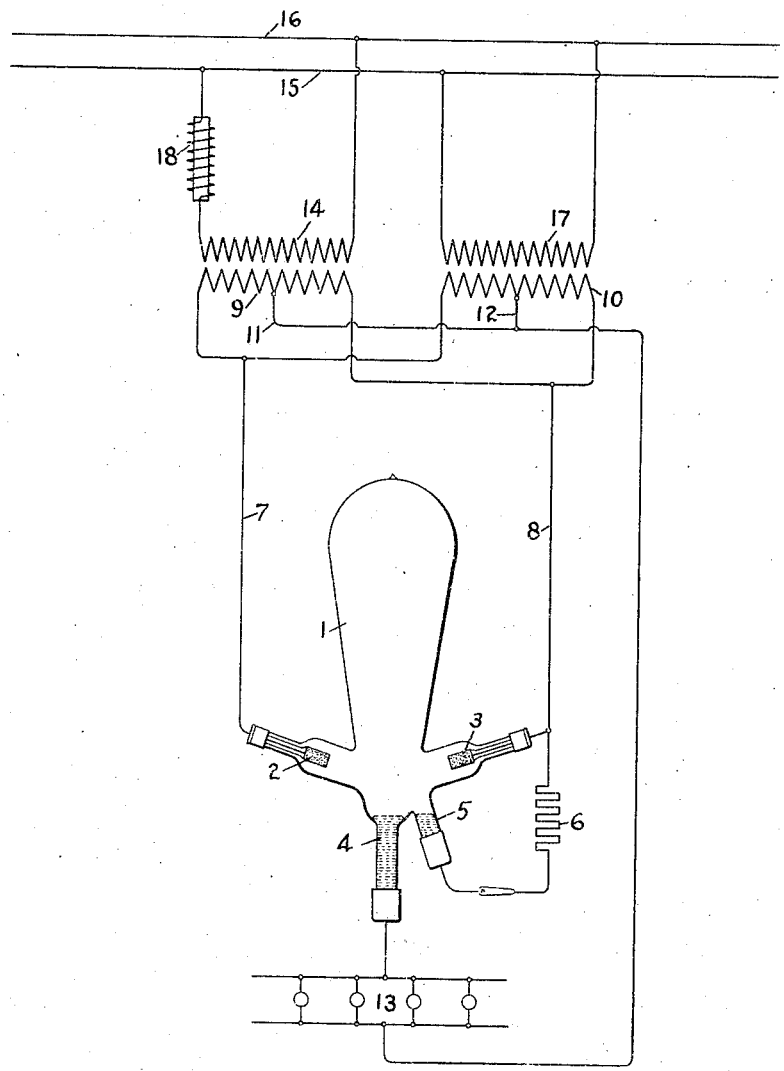
WITNESSES:
Irving E. Steers
J. Ellis Glen
INVENTOR
OSIAS O. KRUH.
BY
ATTY

UNITED STATES PATENT OFFICE.

OSIAS O. KRUH, OF SCHENECTADY, NEW YORK, ASSIGNOR TO GENERAL ELECTRIC COMPANY, A CORPORATION OF NEW YORK.

RECTIFIER SYSTEM.

No. 895,869.      Specification of Letters Patent.      Patented Aug. 11, 1908.

Application filed December 28, 1906. Serial No. 349,792.

*To all whom it may concern:*

Be it known that I, OSIAS O. KRUH, a subject of the Emperor of Austria-Hungary, residing at Schenectady, county of Schenectady, State of New York, have invented certain new and useful Improvements in Rectifier Systems, of which the following is a specification.

This invention relates to an improvement in electrical systems in which a vapor electric device is operated by energy from an alternating current source.

When a vapor electric device, such as a rectifier, is operated by energy from a single phase alternating current source, some means must ordinarily be provided for maintaining the rectifier in a conductive condition during the brief interval of time when the electromotive force of the source passes through the zero value and the current delivered to the tube of the vapor device is insufficient to maintain a conductive condition.

According to my present invention, the vapor device or rectifier is supplied with current from two separate windings connected in parallel and having voltages sufficiently out of phase to cause a continuous flow of current through the rectifier from one or the other of a plurality of anodes. To secure this somewhat unusual result the two windings or secondaries connected with the rectifier are energized by separate primaries, one of them carrying current which is out of phase with that of the other.

The details of my invention will be better understood by reference to the drawing forming a part of this specification.

The vapor electric devices 1 may be of ordinary type having anodes 2 and 3 and a mercury cathode 4, and having a starting anode 5 connected through a resistance 6 with one of the anode leads. The anodes are connected through conductors 7 and 8 with a plurality of transformer secondaries 9 and 10. These transformers are connected directly in parallel and are provided with central taps 11 and 12 by which current may be returned to the windings after passing through the load circuit 13. Secondary 9 is in inductive relation with a primary 14 connected across the single phase alternating current mains 15 and 16. The secondary 10 is similarly energized by a primary 17. In order to secure a displacement in phase between the current in primaries 14 and 17, I employ auxiliary means such as a reactance 18 in series with one of the primary circuits, or I so design the primary circuits as to give them different time constants. If desired, the secondary 9 and its coöperating winding 14 may be nothing more than the windings of an ordinary single phase transformer with a reactance 18 in the primary lead. The windings coöperate in the manner described, with a second transformer made up of the primary 17 and the secondary 10. A very considerable displacement of phase in the secondaries 9 and 10 may be produced by proper adjustment of reactance 18, but I prefer to keep this displacement small enough to prevent abnormal cross currents between the transformer secondaries. By sufficiently displacing the phases of the secondary currents an operative voltage may be maintained on the rectifier at all times. Under these conditions of operation the load may be quite free from inductance.

What I claim as new and desire to secure by Letters Patent of the United States, is,—

1. The combination with a single phase alternating current source, a plurality of transformers connected thereto and having secondaries connected in parallel, a vapor electric device connected to said secondaries, and means for displacing the phase of the current in one transformer secondary with respect to that in the other.

2. The combination of a single phase alternating current source, a plurality of transformers connected thereto and having secondaries supplying energy to a vapor electric device, and means for displacing the phase of current in one transformer primary.

3. The combination with a vapor electric device, a plurality of independent parallel connected windings supplying current thereto and inductively energized from a common source of single phase current, and means for displacing the phase of current in one of said windings.

4. The combination with a single phase source of alternating current, a plurality of transformer primaries receiving current therefrom of different phase, secondaries for said primaries connected in parallel, and a vapor electric device energized by said secondaries.

5. The combination of a single phase source of alternating current, a plurality of transformer primaries receiving current therefrom, reactive means for displacing the current phase in one of said primaries, secondaries connected in parallel and each having a central tap, a vapor rectifier receiving current from said secondaries, and a load circuit connected between said rectifier and said central taps.

6. The combination of a source of single-phase alternating current, a vapor electric device, transforming means connected between said source and said vapor device, and means located between the source and said transforming means for producing an overlap of current waves in said device.

In witness whereof, I have hereunto set my hand this 27th day of December, 1906.

OSIAS O. KRUH.

Witnesses:
BENJAMIN B. HULL,
HELEN ORFORD.